United States Patent [19]

Kassarjian

[11] Patent Number: 5,080,695
[45] Date of Patent: Jan. 14, 1992

[54] METHOD OF REMOVING HYDROGEN SULFIDE FROM LIQUID SULFUR

[75] Inventor: John R. Kassarjian, LaPlace, La.

[73] Assignee: Marathon Oil Company, Findlay, Ohio

[21] Appl. No.: 597,262

[22] Filed: Oct. 12, 1990

[51] Int. Cl.⁵ ............................................. B01D 19/00
[52] U.S. Cl. ........................................ 55/53; 55/73; 55/196
[58] Field of Search ........................... 55/52–54, 55/73, 196, 185, 186, 192, 193; 423/578 R, 578 A

[56] References Cited

U.S. PATENT DOCUMENTS

| | | | |
|---|---|---|---|
| 2,413,102 | 12/1946 | Ebert et al. | 55/52 X |
| 3,364,655 | 1/1968 | Solinhac | 55/52 |
| 3,807,141 | 4/1974 | Estep et al. | 55/193 X |
| 3,920,424 | 11/1975 | Estep et al. | 55/193 |
| 4,131,437 | 12/1978 | Campbell et al. | 55/53 |
| 4,537,605 | 8/1985 | Gouw | 55/54 X |
| 4,778,490 | 10/1988 | Pollert | 55/53 |
| 4,844,720 | 7/1989 | Pendergraft et al. | 55/73 |

FOREIGN PATENT DOCUMENTS

| | | | |
|---|---|---|---|
| 50-028491 | 3/1975 | Japan | 423/578 R |
| 2203732 | 10/1988 | United Kingdom | 423/578 R |

Primary Examiner—Robert Spitzer
Attorney, Agent, or Firm—Jack L. Hummel; Jack E. Ebel

[57] ABSTRACT

Degasification of liquid sulfur produced by the Claus process to remove hydrogen sulfide. The liquid sulfur is caused to flow continuously through a vessel where it is contacted by a counter-flowing inert gas, thereby stripping hydrogen sulfide from the sulfur. Nitrogen and air are preferred examples of inert gas which can be used in the method.

9 Claims, 2 Drawing Sheets

METHOD OF REMOVING HYDROGEN SULFIDE FROM LIQUID SULFUR

FIELD OF THE INVENTION

This invention relates to the degasification of liquid sulfur. More particularly, it relates to the removal of dissolved hydrogen sulfide from liquid sulfur produced by the Claus process.

BACKGROUND OF THE INVENTION

The Claus process is a well known process for producing elemental sulfur from hydrogen sulfide. As used herein, the Claus process refers to a process in which hydrogen sulfide and sulfur dioxide react to produce elemental sulfur and water. Typically, hydrogen sulfide contained in product gas from petroleum refinery operations is partially combusted in a thermal zone to produce sulfur dioxide, which then reacts with the unburned hydrogen sulfide to yield sulfur and water. The sulfur is then condensed and recovered. One or more catalytic zones are also provided in which the same reaction is further promoted by means of a suitable catalyst, causing additional sulfur to be recovered.

An inherent feature of the process is the presence in the produced liquid sulfur of dissolved hydrogen sulfide, which not only contaminates the product but also poses potential hazards in several areas. In addition to creating nuisance odors in the vicinity of liquid sulfur, hydrogen sulfide may be present in such quantities as to reach toxic levels when loading and unloading the sulfur. Further, when dissolved hydrogen sulfide in liquid sulfur contaminates the vapor space in storage tanks and vessels, there is a threat that the lower explosive limit of hydrogen sulfide will be reached.

To eliminate these problems, a number of methods have been suggested or developed to remove hydrogen sulfide from liquid sulfur produced by the Claus process. Release of dissolved hydrogen sulfide has been carried out by agitating the liquid sulfur by various means, such as by circulating and spraying it, by providing a sulfur lift through air bubbling and by circulating the sulfur over a stripping column. In addition, mechanical agitation has been employed. Released hydrogen sulfide is often removed from the pit gas space by sweep gas, which typically is any suitable inert gas such as air, Claus tail gas or nitrogen.

The means presently known for degasifying liquid sulfur, while effective in varying degrees, often involve expensive installations which are not as efficient as desired and which themselves may cause pollution. It would be desirable to be able to use a simpler method of removing hydrogen sulfide from liquid sulfur which does not cause pollution and is not expensive, and yet is also highly efficient.

BRIEF SUMMARY OF THE INVENTION

In accordance with the invention, hydrogen sulfide is removed from liquid sulfur by causing the liquid sulfur to flow in a predetermined direction and stripping hydrogen sulfide from it by contacting the flowing liquid sulfur with inert gas moving in a countercurrent direction. The stripped liquid sulfur is then separated from the inert gas. Any suitable inert gas capable of stripping hydrogen sulfide from the liquid sulfur can be used, such as nitrogen or air.

A preferred manner of carrying out the invention utilizes a pressure vessel, such as the seal pot employed in a Claus process, which contains tubing that directs the liquid sulfur in a downward direction. The inert gas is introduced within the tubing at a point downstream of the point at which the liquid sulfur is introduced so that the gas flows upwardly in a countercurrent direction with respect to the liquid sulfur. The gas bubbles strip hydrogen sulfide from the liquid sulfur and are directed out of the seal pot separately from the stripped liquid sulfur. Implementation of the method does not require expensive equipment, but may utilize existing vessels as explained in more detail hereinafter. In addition, the method is efficient and does not create pollution problems of its own.

The features of the invention which enable it to function in the desired manner are brought out in more detail below in connection with the description of the preferred embodiment, wherein the above and other aspects of the invention, as well as other benefits, will readily be apparent.

DETAILED DESCRIPTION OF THE PREFERRED EMBODIMENT

Figure 1:
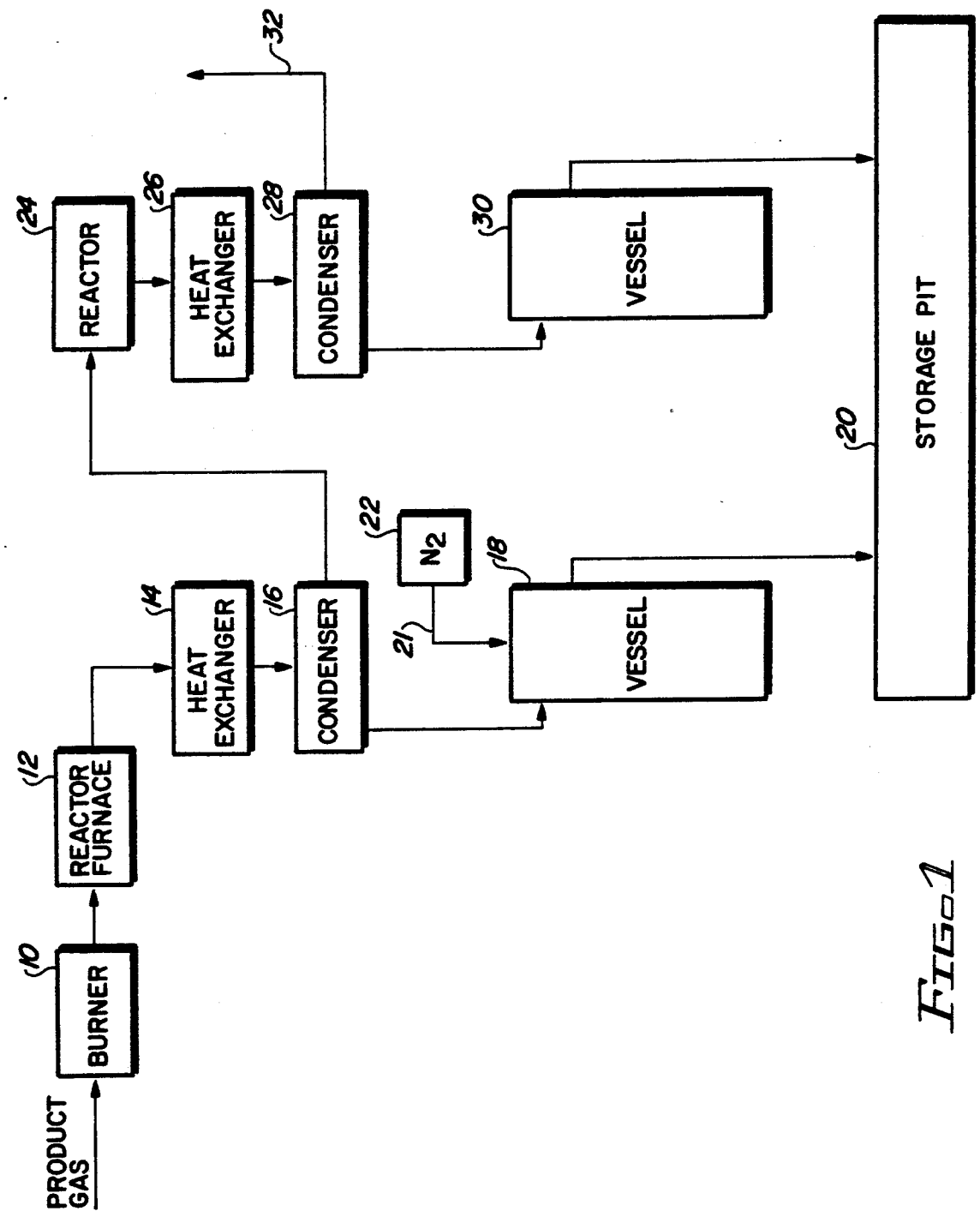
FIG. 1 is a diagrammatic representation of the method of the present invention.

Referring to FIG. 1, a greatly simplified representation of the Claus sulfur manufacturing process is diagrammatically illustrated as comprising a burner 10 into which product gas is introduced. The combustion products of the product gas and oxygen evolve into the reaction furnace 12 where the endothermic reactions of the Claus process take place. The effluent from the reactor furnace passes through a heat exchanger 14 where it is cooled, and then to a condenser 16. Liquid sulfur is condensed out and is introduced into vessel 18, which preferably is a seal pot used to maintain pressure on the process. The liquid sulfur then passes into the sulfur storage pit 20. The method of the present invention involves the introduction of nitrogen gas or other suitable inert gas to the vessel 18 through a line 21 from a header or other source 22.

Still referring to FIG. 1, effluent from the condenser 16 is introduced to the catalytic converter reactor 24 where additional quantities of hydrogen sulfide and sulfur dioxide are reacted to produce additional sulfur, which is introduced into heat exchanger 26 and then to condenser 28. As in the case of the liquid sulfur exiting the condenser 16, the liquid sulfur from the condenser 28 is fed to seal pot 30, from which it passes to the storage pit 20.

It will be understood that the Claus process normally includes additional reactors arranged in series so that the effluent from the condenser 28 would be directed through line 32 to the next downstream reactor. The effluent from the last condenser in the series would flow to a tail gas coelescer which separates liquid sulfur from the tail gases. The tail gases are often further treated to increase the overall sulfur recovery of the process to a very high level, typically in the order of 99.5%. Because the concentration of hydrogen sulfide in liquid sulfur coming from the thermal stage is much greater than in the liquid sulfur coming from the first or subsequent reactor stages, the level of hydrogen sulfide in the liquid sulfur is often perceived as being a significant problem only with respect to the liquid sulfur resulting from the thermal stage. For the purpose of illustrating the invention, therefore, nitrogen gas has been shown as being introduced only to the vessel 18. It could of course also be introduced to vessel 30 or any other downstream seal pots if it is desired to remove hydrogen sulfide from the liquid sulfur at those locations as well.

Figure 2:
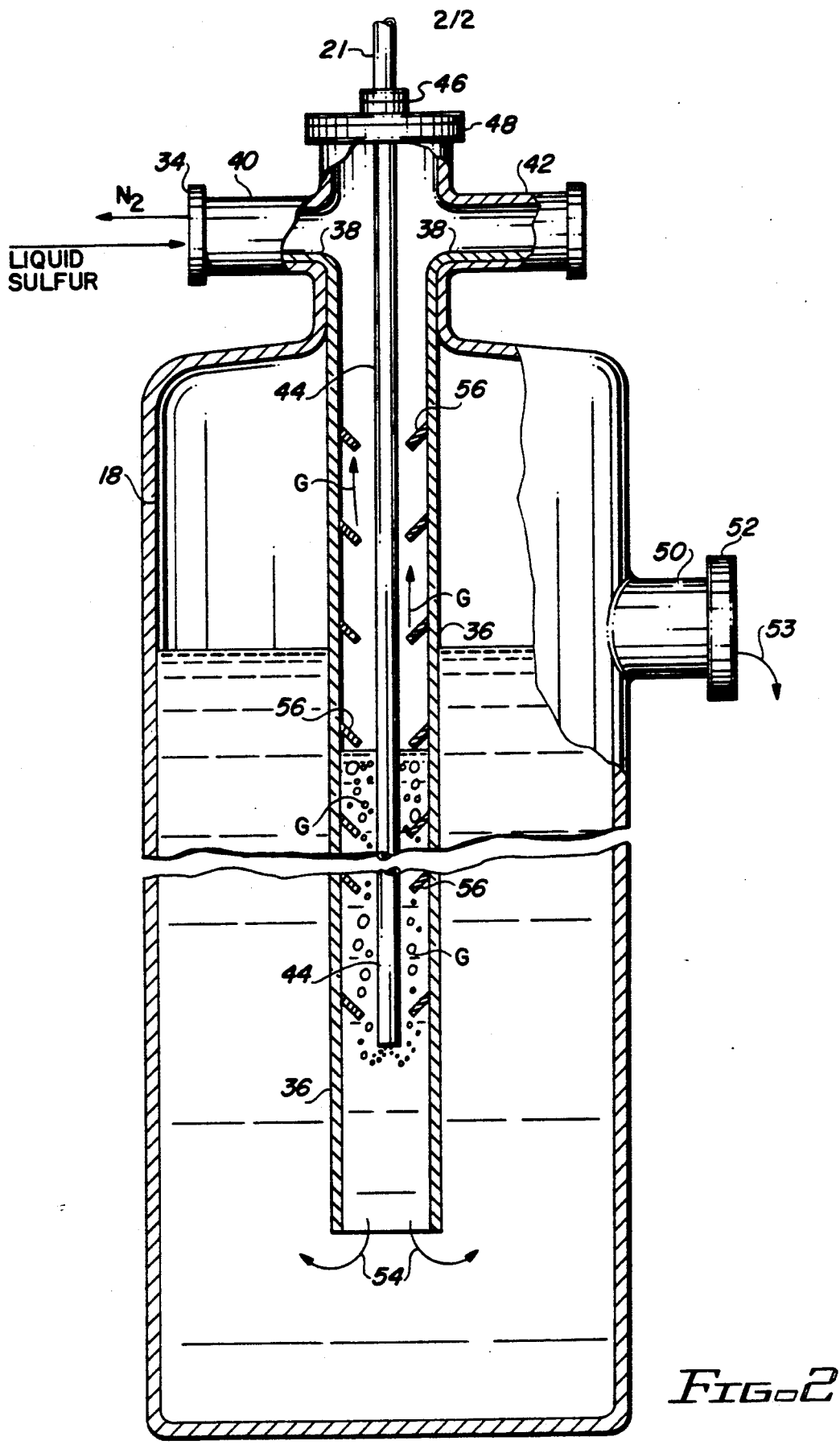
FIG. 2 is an enlarged partial longitudinal sectional view of the pressure vessel in which the removal of hydrogen sulfide takes place, illustrating the means for introducing the sulfur and the inert gas in more detail.

Referring now to FIG. 2, the seal pot 18 comprises an elongated pressure vessel having an inlet 34 through which liquid sulfur is introduced from the condenser. A conduit or tubing 36 is centrally suspended in the vessel from extensions or arms 38, one of which is supported by the lower wall of the extension 40 leading from the inlet 34 to the body of the vessel and the other of which is supported by the lower wall of a similar but closed oppositely facing extension 42. The conduit 36 terminates at a point spaced from the bottom of the vessel 18. Extending axially of the conduit 36 for a substantial portion of the conduit length is a small diameter tube 44. The tube 44 is connected to the nitrogen line 21 through an opening in the upper end 48 of the vessel by means of a suitable connector 46. Located in the upper portion of the vessel 18 at a point lower than the extensions 42 is an extension or arm 50 having an open outlet 52 communicating with the storage pit 20 shown in FIG. 1.

In operation, nitrogen gas is delivered under pressure through the line 21 to the tube 44, and at the same time liquid sulfur from the process is introduced to the vessel 18 through the inlet 34. Although not shown, it will be understood that the nitrogen line between the nitrogen source and the vessel 18 may include pressure gauges and valves as needed, as are well known in the design of pressurized gas lines. The liquid sulfur enters the conduit 36 and flows down through the open end of the conduit as indicated by the flow arrows 54. As the liquid sulfur flows through the conduit 36 it is exposed to the nitrogen gas G bubbling up from the open bottom end of the tube 44. The gas and the liquid sulfur are maintained in contact due to the relatively small annular space between the tube 44 and the conduit 36. As an example, the gas line may be ½ inch in diameter, while the conduit 36 through which the sulfur flows may be in the order of 4 inches in diameter.

As a result of the countercurrent flow of the nitrogen gas through the liquid sulfur, hydrogen sulfide is stripped from the sulfur. Thus liquid sulfur which has been stripped of hydrogen sulfide flows out the open bottom end of the conduit 36, up the annulus between the wall of the vessel 18 and the conduit 36 and through the outlet 52 to the storage pit, as indicated by the flow arrow 53. The nitrogen gas flows up the conduit 36 and out the inlet 34 back to the manufacturing process, where most of the accompanying hydrogen sulfide is converted to sulfur and recovered before venting the nitrogen to the atmosphere.

It will be noted that the level of liquid sulfur in the conduit 36 is lower than the level of liquid sulfur in the annulus between the conduit 36 and the walls of the seal pot 18. This difference is due to the difference in pressure between these two points, which corresponds to the amount of pressure in the process. In a typical example such a pressure differential may be in the area of 4 to 5 psig, which may correspond roughly to a difference in sulfur surface levels of about 6 to 7 feet.

It can be appreciated that there are no fixed parameters of operation since operating conditions may change considerably in accordance with structural and process variations between installations. In general, however, the portion of the conduit which is common to the flow of both liquid sulfur and gas should be long enough to ensure sufficient intimate contact between the gas and the liquid sulfur so that adequate stripping of hydrogen sulfide takes place. Further, the annular space between the gas tubing and the conduit should be large enough so as not to restrict the flow of sulfur through the vessel as required by the output of the manufacturing process, but small enough to allow the desired intimate contact. Obviously, the pressure of the stripping gas must be sufficient to overcome the pressure of the liquid sulfur and the pressure head at the bottom of the tube 44 in order to escape from the tube. For example, in a typical arrangement the conduit 36 may be about 20 feet in length and the gas tube 44 may be about 15 feet, resulting in the stripping gas being in contact with the flowing liquid sulfur for about 12 feet. A typical arrangement of the type described should be capable of removing on the average about 50% of the hydrogen sulfide present in the liquid sulfur coming from the process. Thus a hydrogen sulfide content in the liquid sulfur of about 300 ppmw could be expected to be reduced to an amount in the range of about 100 to 180 ppmw.

Additional steps may be taken to make the method still more efficient. For example, the period of time that the sulfur and inert gas are in contact may be increased by further elongating the gas tube 44, the conduit 36 and the seal pot 18, thereby increasing the amount of hydrogen sulfide stripped from the sulfur. Another approach, as shown in FIG. 2, is to provide baffles 56 on the inner wall of the conduit 36. The baffles will cause more turbulent flow, thereby providing additional agitation and resulting in a greater tendency of the liquid sulfur to release dissolved hydrogen sulfide.

As mentioned above, although the description of the preferred embodiment of the invention refers to the use of nitrogen as the stripping gas of preference, any inert gas capable of carrying out the stripping function may be used instead. Air, for example, may be preferred in some cases.

Because liquid sulfur produced by the Claus process contains hydrogen polysulfides which are bound to the sulfur and which naturally decompose to hydrogen sulfide under appropriate temperature and pressure conditions such as those encountered during shipping, liquid sulfur is sometimes treated with a catalyst to accelerate the decomposition of hydrogen polysulfides to hydrogen sulfide. This not only enables the removal of the normally available dissolved hydrogen sulfide but also precludes the formation of hydrogen sulfide which would have been created at a later time through the process of natural decomposition. It will be understood that in one aspect the present invention is not concerned with the presence of hydrogen polysulfides but is directed only to the removal of dissolved hydrogen sulfide which is present at the time of treatment. In this context, the invention may be considered as a preliminary treatment for processes which contemplate the further treatment of liquid sulfur in the storage area for the purpose of removing hydrogen sulfide which has decomposed from hydrogen polysulfides, or it can be utilized as the only treatment in process environments that do not require removal of hydrogen sulfide beyond the amount of dissolved hydrogen sulfide in the sulfur at the time of treatment. In either case the present invention provides an efficient method, having only modest equipment needs, of significantly reducing the amount of dissolved hydrogen sulfide in liquid sulfur. Because the method is carried out in an enclosed environment and does not involve the use of catalysts, it does not cause pollution problems itself.

In another aspect, it can be seen that the present invention could be used to strip out hydrogen sulfide evolving from polysulfides in the sulfur in the event catalysts or activators used to decompose polysulfides are added to the sulfur before it enters the seal pot.

It should now be appreciated after reading the foregoing description that the invention need not necessarily be limited to all the specific details described in connection with the preferred embodiment, but that changes to certain features which do not alter the overall basic function and concept of the invention may be made without departing from the spirit and scope of the invention defined in the claims.

What is claimed is:

1. A method of removing hydrogen sulfide from liquid sulfur, comprising the steps of:
    introducing liquid sulfur containing hydrogen sulfide into an upstream portion of a conduit, the conduit having a fluid outlet in a downstream portion thereof located within a vessel;
    causing the liquid sulfur to flow through the conduit outlet into the vessel;
    introducing inert gas into the conduit in the downstream portion thereof;
    causing the inert gas in the conduit to flow counter to the direction of flow of the liquid sulfur while contacting the liquid sulfur, thereby stripping hydrogen sulfide from the liquid sulfur in the conduit upstream from the conduit outlet;
    removing stripped liquid sulfur from the vessel; and
    removing the used inert gas from the conduit.

2. The method of claim 1, wherein the conduit is substantially vertically aligned.

3. The method of claim 2, wherein the inert gas flows upwardly in the form of bubbles released into the liquid sulfur in the conduit.

4. The method of claim 1, wherein the liquid sulfur has been produced by the Claus process and the used inert gas is introduced back into the sulfur producing process.

5. The method of claim 4, wherein the liquid sulfur is caused to flow through the conduit and out a fluid outlet in the vessel by the pressure in the Claus process.

6. The method of claim 1, wherein the inert gas comprises nitrogen.

7. The method of claim 1, wherein the inert gas comprises air.

8. The method of claim 1, wherein the inert gas is introduced from a tube within the conduit, the tube extending substantially axially of the conduit.

9. The method of claim 1, wherein the conduit includes a plurality of spaced baffles extending into the path of flow of the liquid sulfur, the liquid sulfur contacting the baffles during flow through the conduit and being agitated thereby.

* * * * *